United States Patent [19]

Szabo et al.

[11] 3,744,566

[45] July 10, 1973

[54] SECONDARY OIL RECOVERY PROCESS

[75] Inventors: Miklos Tamas Szabo, Coraopolis; Jerry Emile Boothe, Pittsburgh; Andrew Jackson Sharpe, Jr.; Fred David Martin, both of McMurray, all of Pa.

[73] Assignee: Calgon Corporation, Pittsburgh, Pa.

[22] Filed: Mar. 16, 1972

[21] Appl. No.: 235,399

[52] U.S. Cl. .............................. 166/275, 252/8.55 D
[51] Int. Cl. .............................................. E21b 43/22
[58] Field of Search ................... 166/275, 274, 273, 166/305 R; 252/8.55 D; 260/80.3, 561 N, 86.1

[56] References Cited
UNITED STATES PATENTS

| | | | |
|---|---|---|---|
| 2,980,657 | 4/1961 | Melamed | 260/86.1 |
| 3,039,529 | 6/1962 | McKennon | 166/275 |
| 3,543,855 | 12/1970 | Blatz et al. | 166/275 X |
| 3,562,226 | 2/1971 | Gayley et al. | 260/80.3 |
| 3,666,810 | 5/1972 | Hoke | 260/561 N |
| 3,679,000 | 7/1972 | Kaufman | 166/275 |

Primary Examiner—Stephen J. Novosad
Attorney—Martin L. Katz et al.

[57] ABSTRACT

Polymers of (3-acrylamido-3-methyl) butyl trimethyl ammonium chloride and related N-(alkyl amino) acrylamides are used as additives to water for waterflooding in the secondary recovery of oil.

8 Claims, No Drawings

SECONDARY OIL RECOVERY PROCESS

BACKGROUND OF THE INVENTION

This invention relates to an improved flooding process utilizing water-soluble polymers and copolymers of certain N-(alkyl ammonium) acrylamides.

Secondary recovery of oil by flooding has become widely practiced in the petroleum industry. In the usual secondary recovery process, a flooding liquid is injected into the subterranean formation through a pattern of injection wells which surround one or more producing wells. The flooding fluid (usually water) is forced down the injection wells into the formation where it acts as an immiscible front which displaces the oil by forcing and carrying it toward the producing well where it is recovered by conventional methods.

The efficiency of the flooding operation is commonly defined in terms of the ratio of oil recovered to water recovered or $(Qo/Qw)$. This ratio can be expressed by the formula $$(Qo)/(Qw) = (Ko)/(Kw) \times (\mu w)/(\mu o)$$

where $Qo$ and $Qw$ are the volumetric flow rates of the oil and water, respectively, $Ko$ and $Kw$ are the effective permeabilities of the subterranean oil-bearing formation to oil and the displacing fluid and $\mu o$ and $\mu w$ are the viscosities of the oil and displacing fluid in centipoises.

It is apparent from this formula that the efficiency of the flooding operation is dependent on the ratio of the viscosity of the displacing medium $\mu w$, to the viscosity of the displaced oil, $\mu o$. See also Meadors et al U.S. Pat. No. 3,076,504. Since, at a given fluid saturation, the effective permeabilities of $Ko$ and $Kw$ are inherent properties of the particular subterranean formation being flooded, the efficiency formula reduces to $$(Qo)/(Qw) = C \times (\mu w)/(\mu o)$$

where $C$ is the value of $(Ko)/(Kw)$ at a particular saturation. From the reduced formula we can see that in any flooding operation the efficiency can be increased by increasing $\mu w$ and/or decreasing $\mu o$.

An alternative method of expressing efficiency, which has found wide use in the art, is mobility ratio or $MR$. Mobility is defined as the ratio of the permeability of the formation to the viscosity of the liquid or $M = K/\mu$. The mobility ratio for a flooding operation is the ratio of the mobility of the displacing liquid to the mobility of the oil or $$MR = \frac{Mw}{Mo} = \frac{\frac{Kw}{\mu w}}{\frac{Ko}{\mu o}}$$

A mobility ratio greater than one is unfavorable. In this instance the flooding medium, being more mobile than the oil, would commonly tend to "finger" through the oil zone resulting in poor oil recovery efficiency. A mobility ratio less than or equal to one is desirable since the displacement of oil would occur in a piston-like fashion with the flooding front acting like a piston.

Once again, since $Ko$ and $Kw$ are inherent characteristics of the subterranean formation, we can seen that the mobility ratio formula can be reduced to $$MR = (1)/(C) \times (\mu o)/(\mu w)$$

An increase in $\mu w$ and/or a decrease in $\mu o$ causes a decrease in the $MR$ value and a resulting increase in the efficiency of the flooding operation.

The desirability of improving the water/oil mobility ratio in waterflooding operations has long been appreciated, especially for high viscosity crudes. Methods of reducing the oil viscosity by application of heat, gas resaturation, and miscible drives have met with some success. However, increasing the viscosity of the displacing fluid has become an attractive approach to improving oil recovery.

Most commonly water or brine is used as the displacing fluid. Many water or brine additives have been used by the oil field industry to increase the viscosity of the flooding medium. For example, see U.S. Pat. No. 2,731,414 where Binder et al. disclose the use of carboxy methyl cellulose, locust bean gum, gum Karaya, and Irish moss for increasing the viscosity of the flooding water. In U.S. Pat. No. 2,771,138, Beeson discloses the use of a combination of sugar and a metal salt. Sparks in U.S. Pat. No. 3,053,765 teaches the incorporation of a polysaccharide to thicken the flooding water. Lindblom et al in U.S. Pat. No. 3,305,016 use a heteropolysaccharide made by a bacterium of the genus Xanthomonas.

While most of these naturally occurring compounds are effective to a certain extent in increasing the viscosity of flood water, they are characterized by serious disadvantages. Some of the materials have a tendency to precipitate in the presence of the dissolved inorganic salts found in the subterranean formation with a resulting plugging of the formation. Some of the materials are relatively unstable at the elevated temperatures found in the formations and some have relatively little thickening effect. Most of these compounds are quite expensive and therefore not economically feasible. In order to overcome these disadvantages the trend has been toward the use of synthetic polymers as thickening agents. In U.S. Pat. No. 2,842,492, von Engelhardt et al. teach the use of copolymers of methacrylic acid and methyl-methacrylate as thickening agents. Zerweck et al in U.S. Pat. No. 3,020,953, Sandiford et al. in U.S. Pat. No. 2,827,964, and McKennon in U.S. Pat. No. 3,039,529 teach the use of water-soluble polyacrylamides. See also Sandiford et al U.S. Pat. No. 3,116,791 where the use of water-soluble polyalkylene oxides is taught. Kaufman in Canadian Pat. 864,433, proposes the use of N-sulfohydrocarbon substituted acrylamides.

Crosslinked polyacrylamide is used for soil stabilization by Morgan et al in U.S. Pat. No. 2,801,984 and in certain types of well treatment in Holbert et al. U.S. Pat. No. 3,210,310.

The technique of "selective plugging" of more permeable sections of the formation in order to increase flow in a less permeable section, through the use of various synthetic water-soluble polymers, is disclosed by Bond et al in U.S. Pat. No. 2,864,448.

While most of the synthetic polymers overcome the disadvantages of the naturally occurring compounds, they are characterized by other serious disadvantages. The viscosities of the polymers are greatly decreased when they come into contact with brines. Since brine is the usual displacing fluid, this is a serious problem. The most widely used synthetic polymer is partially hydrolyzed polyacrylamide. It has been known for years that partially hydrolyzed polyacrylamides when dissolved in pure water form much more viscous solutions then the unhydrolyzed polyacrylamides. However, most of this viscosity increase is lost in water containing dissolved inorganic salts. The dissolved salts change the dielectric of the fluid so that the mutual repulsion of the charged groups is nullified, with a corresponding drop in viscosity. Unhydrolyzed polyacrylamides increase the viscosity of the flooding medium but they do not possess a good hydrophobic/hydrophilic ratio. If the synthetic polymer does not contain a favorable hydrophobic/hydrophilic ratio, it has a tendency to precipitate from the flooding fluid. This precipitation is a serious disadvantage since it causes plugging and a drop in the viscosity of the flooding medium. Another disadvantage of the synthetic polymers is that it is often desirable to add surface active or wetting agents to the flooding medium to improve the contact between the flooding medium and the preferentially oil/wet particles of the formation. For example, see Cooper, U.S. Pat. No. 3,418,239.

Synthetic polymers such as acrylamide polymers have been used in oil recovery together with ammonium hydroxide (U.S. Pat. No. 3,367,418) and with polyvalent cations (U.S. Pat. No. 2,842,338). The prior art generally, however, employs only polymers which are anionic or nonionic. Cationic polymers such as the ones we propose have not been used.

SUMMARY OF THE INVENTION

Our invention contemplates the use of water-soluble polymers including at least one percent by weight monomers of the formula

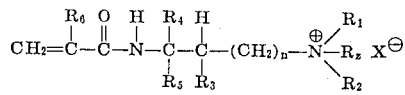

in which "$R_1$" and "$R_2$" are independently selected from linear and branched alkyl groups having up to 18 carbon atoms, aralkyl groups having up to 10 carbon atoms, and in which "$R_1$" and "$R_2$" may be combined to form a heterocyclic group having one or more hetero atoms; "$R_3$" is selected from the group of hydrogen, lower alkyl groups of one to four carbon atoms and halogen; "$R_4$" is selected from the group of hydrogen, halogen, a linear or branched alkyl group of up to five carbon atoms; "$R_5$" is phenyl, lower alkyl (one to four carbon atoms), substituted phenyl wherein the substituents may be lower alkyl (one to four carbon atoms), or lower alkoxy (one to four carbon atoms); "$R_3$" or "$R_4$" can combine with "$R_5$" to form a cyclic group of at least six carbon atoms or a bicyclic group of at least seven carbon atoms, which groups can be substituted with a linear or branched alkyl group having up to five carbon atoms; "$R_6$" is selected from hydrogen and methyl; "$R_z$" may be any group capable of quaternizing the nitrogen, including the group consisting of hydrogen, benzyl, phenethyl, cyanoethyl, and linear, branched and substituted alkyl and aralkyl groups having one to 16 carbon atoms, the substitutions therefor being halide, — OH, — $COO^{\ominus}$, and — $SO_3^{\ominus}$, where the counter ion for the anionic substitution is normally hydrogen or alkali metal; "$X^-$" may be any anion, preferably halide, alkosulfate, tosylate, carboxylate, sulfonate, sulfate, phosphate, acetate, or nitrate; and $n$ is an integer from 0 to 2. Where the substitution is anionic, the preferred associated cation is hydrogen or alkali metal.

The monomer may be copolymerized with any copolymerizable water-soluble monomer. Among the copolymerizable monomers useful in our invention are acrylic acid, methacrylic acid, the alkali metal, amine and ammonium salts of acrylic and methacrylic acids, methacrylamide, β-aminoethyl acrylate, β-aminoethyl methacrylate, N-methyl-β-aminoethyl acrylate, N-methyl aminoethyl methacrylate, N,N-dimethyl β-aminoethyl methacrylate, and the water-soluble N-alkyl substituted acrylamides and methacrylamides such as N-isopropyl acrylamide. Still other comonomers of the water-soluble class are the alkali metal styrene sulfonates, and alkali metal vinylbenzoates. Also useful are allyl alcohol, N-vinyl pyridine, N-vinyl pyrrolidone, N-vinyl-2-oxazolidone, and dialkyl diallyl ammonium halides.

We may also use the amine form of the above formula, i.e., where "$R_z$" is not present and an associated anion is not necessary.

The preferred cationic monomer is (3-acrylamido-3-methyl) butyl trimethyl ammonium chloride (AMBTAC). -acrylamido- Preferred polymers are those having molecular weights of at least 100,000. Chemically, the preferred polymers are copolymers of about 60 to 90 mole percent acrylamide (AM) and about 10 to 40 mole percent monomers of the above formula, preferably (3-acrylamindo-3-methyl) butyl trimethyl ammonium chloride. However, we may use copolymers of from 10 to 99 mole percent acrylamide and about 1 to 90 percent monomers of the above formula. The various water-soluble monomers mentioned above also may be used to make contemplated copolymers with monomers of the above formula. However, the acrylamide copolymers are preferred.

The viscosities of the polymers we use are comparable to or higher than homopolymers of acrylamide. Resistance factors obtained with a preferred copolymer were higher than those obtained with a commercial hydrolyzed polyacrylamide in a comparative test.

COMPARATIVE TEST

Polymers were dissolved in 2 percent NaCl brine. Concentrations of a 15 percent hydrolyzed polyacrylamide and a 70/30 mole ratio AM/AMBTAC cationic copolymer solution were the same: 500 milligrams per liter.

First the solutions of the polymers were pumped through a filter, which contained a 700 md silica sand. No change in polymer concentrations was observed in the effluent after 2 pore volumes of injected solution were passed through. Upon attaining 3 pore volumes of injected solution through the filter pack, the outlet of the filter was connected to a sandpack, which contained the same sand material as was used in the filter. This second sandpack had 75 milliliters pore volume fully saturated with 2 percent NaCl brine. After connecting the filter to the second sandpack, the injection of the filtered solution was started into the second sandpack. The pressures were recorded, and the resistance factors were computed as a function of injected pore volumes.

After a polymer treatment, the polymer solutions were flushed out with 2 percent NaCl brine. The pressures were also recorded during brine flushes.

Prior to any new test, both the filter and the sandholder were repacked. In each test during the displacement of brine with polymer solution or during the brine flush the same eleven feet per day frontal advance rate of injection was applied.

Results from this comparative test are as follows.

Polymer Flow

| Polymer | Resistance Factor at 2 PVI* | Resistance Factor at 5 PVI* |
|---|---|---|
| 15% Hydrolyzed polyacrylamide | 3.361 | 5.023 |
| Cationic copolymer 70/30 AM/AMBTAC | 5.06 | 7.229 |

Brine Flush

| Polymer | Residual Resistance Factor at 5 PVI* |
|---|---|
| 15% Hydrolyzed polyacrylamide | 2.031 |
| Cationic copolymer 70/30 AM/AMBTAC | 3.739 |

*Pore Volumes Injected

In carrying out the invention, the polymer is dissolved in water in any suitable fashion to provide a solution having the desired viscosity. Alternatively, the polymer may be dissolved in brine or an aqueous solution of said polymer may be diluted with brine to form a solution having ionic constituents similar or identical to those in the connate water in the oil field wherein the secondary recovery procedure is to be employed. In a preferred method of operation, the viscous solution is prepared with oil field brine obtained from the producing strata or from strata adjacent to the producing strata whereby undesired changes in the strata by reason of introduction of the pusher fluid are minimized.

In such operations, the concentration of the polymer in the water or brine employed to produce the pusher fluid may be adjusted to produce the desired viscosity of said fluid. In general, with the high molecular weight polymer preferably employed, it is desirable to use from about 0.01 to 0.5 percent by weight or more of polymer in the fluid. In practice, the fluid may have a viscosity of from slightly over that of pure water (1.0 centipoise at 20°C) to about 1,000 centipoises and preferably from about 1.1 to 100 centipoises. The exact viscosity to be employed for maximum efficiency in recovery of oil will vary depending upon such factors as the porosity and permeability of the oil-bearing formation, the viscosity of the oil in the formation and the particular type of oil-bearing strata involved. In many cases, good results are obtained when the fluid is adjusted to a viscosity ranging from about the viscosity of the oil in place in the producing strata to about one-half the viscosity of such oil.

A particular advantage of our polymer is its cationic characteristics. The cationic charge sites on the polymer render it compatible with most oil field brines, which typically contain generous quantities of dissolved polyvalent cations. Calcium and other polyvalent cations are deleterious to the efficiency of the more highly charged anionic polymers such as the various sulfonated polymers mentioned above and to the weakly charged ones such as the acrylic acid containing polymers. A particular advantage of our process will accrue in brines having over 2 percent dissolved solids.

To summarize, the secondary oil recovery process of our invention comprises (a) forming as a flooding medium a solution of about 20 ppm to about 6,500 ppm of a water-soluble homopolymer or copolymer of at least 1 mole percent of the above formula, (b) injecting said flooding medium into an injection well penetrating a subterranean oil-bearing formation, and (c) forcing said flooding medium through said formation toward at least one output well in said formation.

We claim:

1. In a method of recovering oil from an underground formation in which an aqueous flooding medium is forced from an injection well toward a producing well to displace the oil in said formation, the improvement comprising adding to said aqueous flooding medium a water-soluble polymer including at least 1 percent by weight cationic monomers of the formula

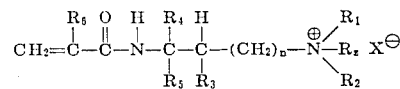

in which "$R_1$" and "$R_2$" are independently selected from linear and branched alkyl groups having up to 18 carbon atoms, aralkyl groups having up to 10 carbon atoms, and in which "$R_1$" and "$R_2$" may be combined to form a heterocyclic group having one or more hetero atoms; "$R_3$" is selected from the group of hydrogen, lower alkyl groups of one to four carbon atoms and halogen; "$R_4$" is selected from the group of hydrogen, halogen, a linear or branched alkyl group of up to five carbon atoms; and "$R_5$" is phenyl, lower alkyl (one to four carbon atoms), substituted phenyl wherein the substituents may be lower alkyl (one to four carbon atoms), or a lower alkoxy (one to four carbon atoms); "$R_3$" or "$R_4$" can combine with "$R_5$" to form a cyclic group of at least six carbon atoms or a bicyclic group of at least seven carbon atoms, which groups can be substituted with a linear or branched alkyl group having up to five carbon atoms; "$R_6$" is selected from hydrogen and methyl; "$R_Z$" may be any group capable of quaternizing the nitrogen, including the group consisting of hydrogen, benzyl, phenethyl, cyanoethyl, and linear, branched and substituted alkyl and aralkyl groups having 1 to 16 carbon atoms, the substitutions therefor being halide, — OH, — COO$^\ominus$, and — SO$_3$, where the counter ion for the anionic substitution is normally hydrogen or alkali metal; "$X^-$" may be any anion, preferably halide, alkosulfate, tosylate, carboxylate, sulfonate, sulfate, phosphate, acetate, or nitrate; and $n$ is an integer from 0 to 2.

2. Method of claim 1 in which the polymer has a molecular weight of at least 100,000.

3. Method of claim 1 in which the cationic monomer is (3-acrylamido-3-methyl) butyl trimethyl ammonium chloride.

4. Method of claim 1 in which the polymer is a copolymer including about 10 to about 99 mole percent acrylamide.

5. Method of claim 1 in which the polymer is a copolymer of about 60 to about 90 mole percent acrylamide and the balance is (3-acrylamido-3-methyl) butyl trimethyl ammonium chloride.

6. Method of claim 1 in which the aqueous flooding medium is a brine of at least 2 percent dissolved solids.

7. A secondary oil recovery process comprising forming a flooding medium of an aqueous solution of from 20 to 6,500 ppm water-soluble polymer of (3-acrylamido-3-methyl) butyl trimethyl ammonium chloride, injecting the flooding medium into an injection well penetrating a subterranean oil-bearing formation, and forcing the flooding medium through said formation towards at least one producing well in said formation.

8. In a method of recovering oil from an underground formation in which an aqueous flooding medium is forced from an injection well toward a producing well to displace the oil in said formation, the improvement comprising adding to said aqueous flooding medium a water-soluble polymer including at least 1 percent by weight cationic monomers of the formula

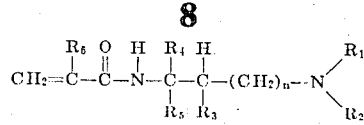

in which "$R_1$" and "$R_2$" are independently selected from linear and branched alkyl groups having up to 18 carbon atoms, aralkyl groups having up to 10 carbon atoms, and in which "$R_1$" and "$R_2$" may be combined to form a heterocyclic group having one or more hetero atoms; "$R_3$" is selected from the group of hydrogen, lower alkyl groups of one to four carbon atoms and halogen; "$R_4$" is selected from the group of hydrogen, halogen, a linear or branched alkyl group of up to five carbon atoms; "$R_5$" is phenyl, lower alkyl (one to four carbon atoms), substituted phenyl wherein the substituents may be lower alkyl (one to four carbon atoms), or lower alkoxy (one to four carbon atoms); "$R_3$" or "$R_4$" can combine with "$R_5$" to form a cyclic group of at least six carbon atoms or a bicyclic group of at least seven carbon atoms, which groups can be substituted with a linear or branched alkyl group having up to 5 carbon atoms; "$R_6$" is selected from hydrogen and methyl; and $n$ is an integer from 0 to 2.

* * * * *